US010230821B2

(12) United States Patent
Barsumian et al.

(10) Patent No.: US 10,230,821 B2
(45) Date of Patent: Mar. 12, 2019

(54) SYSTEM AND METHOD FOR DETECTING VOIP TRAFFIC

(71) Applicant: Research Electronics International, Cookeville, TN (US)

(72) Inventors: Bruce R. Barsumian, Cookeville, TN (US); Thomas H. Jones, Cookeville, TN (US); Ross Alan Binkley, Cookeville, TN (US)

(73) Assignee: Research Electronics International, LLC, Cookeville, TN (US)

( * ) Notice: Subject to any disclaimer, the term of this patent is extended or adjusted under 35 U.S.C. 154(b) by 109 days.

(21) Appl. No.: 14/984,188

(22) Filed: Dec. 30, 2015

(65) Prior Publication Data

US 2016/0191390 A1    Jun. 30, 2016

Related U.S. Application Data

(60) Provisional application No. 62/097,924, filed on Dec. 30, 2014.

(51) Int. Cl.
    *H04L 12/26*      (2006.01)
    *H04L 29/08*      (2006.01)
    (Continued)

(52) U.S. Cl.
    CPC ............ *H04L 67/36* (2013.01); *H04L 1/0668* (2013.01); *H04L 41/142* (2013.01); *H04L 43/0894* (2013.01)

(58) Field of Classification Search
    CPC ... H04L 67/36; H04L 43/0894; H04L 41/142; H04L 1/0668
    See application file for complete search history.

(56) References Cited

U.S. PATENT DOCUMENTS 7,170,860 B2 *   1/2007    Partridge ............ H04L 63/1408
                                                                      370/210
8,228,861 B1 *   7/2012    Nix ...................... H04W 36/00
                                                                         370/329

(Continued)

OTHER PUBLICATIONS

Kuan-Ta Chen "Rapid Detection of Constant-Packet-Rate Flows", IEEE, published in: 2008 Third International Conference on Availability, Reliability and Security; Year: 2008, pp. 212-220.*

*Primary Examiner* — Lan-Huong Truong
(74) *Attorney, Agent, or Firm* — HornKohl Intellectual Property Law, PLLC; Jason L. Hornkohl

(57) ABSTRACT

A system and method of classifying a set of internet protocol network data traffic as likely or unlikely to contain constant-packet-rate data or VoIP traffic using frequency spectrum analysis of data packet arrival times. The method is performed with an apparatus connected in-line on the network link from which the set of network data traffic is obtained. The network data traffic is presorted by packet size, source IP address, destination IP address, source port number, destination port number, or transport-layer protocol to limit the required analysis. A sliding window function is used to provide the time-domain input data to the frequency spectrum analysis. A threshold function is used to detect peaks in the calculated frequency spectrum that indicate constant-packet-rate traffic. An automated system preferably captures the network data traffic from one or more network links, immediately performs the frequency spectrum analysis on the data traffic and stores the results in memory for later access.

23 Claims, 4 Drawing Sheets

(51) Int. Cl.
*H04L 1/06* (2006.01)
*H04L 12/24* (2006.01)

(56) References Cited

U.S. PATENT DOCUMENTS

| | | | | |
|---|---|---|---|---|
| 2007/0104335 A1* | 5/2007 | Shi | ............................ | H04R 3/02 381/93 |
| 2011/0090792 A1* | 4/2011 | Ronneke | .................. | H04L 47/10 370/232 |
| 2012/0020397 A1* | 1/2012 | Estrada | .............. | G01R 19/2516 375/224 |
| 2012/0271190 A1* | 10/2012 | Mortensen | ............ | A61B 5/0488 600/546 |
| 2014/0310394 A1* | 10/2014 | Wood | ....................... | H04L 43/04 709/224 |
| 2015/0038098 A1* | 2/2015 | Guldberg | ............... | H04B 15/00 455/296 |

\* cited by examiner

SYSTEM AND METHOD FOR DETECTING VOIP TRAFFIC

CROSS-REFERENCES TO RELATED APPLICATIONS

The present application claims priority from Provisional Patent Application No. 62/097,924 entitled "System and Method for Detecting VOIP Traffic" filed Dec. 30, 2014, which is hereby incorporated by reference.

STATEMENT REGARDING FEDERALLY SPONSORED RESEARCH OR DEVELOPMENT

Not Applicable.

REFERENCE TO SEQUENCE LISTING OR COMPUTER PROGRAM LISTING APPENDIX

Not Applicable.

BACKGROUND OF THE INVENTION

Covert surveillance methods such as wiretapping and malicious modification of telephone systems pose a serious threat to the security of sensitive information in many industries. In particular, since telephones have become ubiquitous and contain all of the components needed to capture audio and transmit it to a remote location where it can be monitored, they have become a common target for eavesdropping attacks. While much focus has been given to interception of sensitive telephone calls, another common method of attack is to modify telephone systems to listen to and transmit the audio from a room, even when a call is not in progress. While many methods exist for detecting whether analog and basic unencrypted digital telephone systems are transmitting audio while on-hook, detection of the presence of audio on the Voice over IP (VoIP) telephony systems that have been gaining popularity over the last decade can usually not be accomplished using these traditional methods. Existing attempts to detect VoIP traffic within IP network traffic are numerous, but these are often protocol-specific and generally not designed to detect VoIP traffic that is intentionally attempting to evade detection and, as such, are unsuitable for use in counter-surveillance applications. Therefore, what is needed is an improved method of detecting the presence of VoIP data in network traffic that is not specific to a particular VoIP system and is not easily evaded.

BRIEF SUMMARY OF THE INVENTION

An embodiment of the present invention is directed toward a method of classifying a set of internet protocol network data traffic as containing constant-packet-rate data traffic. The method is preferably performed with an apparatus connected in-line on the network link from which the set of internet protocol network data traffic is obtained. The internet protocol network data traffic is presorted by packet size, source IP address, destination IP address, source port number, destination port number, or transport-layer protocol to limit the analysis. In accordance with the method, Fourier analysis is performed on the data packet arrival times to classify the set of internet protocol network data traffic as likely or unlikely to contain constant-packet-rate data. In addition, the internet protocol network data traffic is classified as likely or unlikely to contain voice over internet protocol traffic. A sliding window function is used to provide time-domain input data to the Fourier analysis. A threshold function is then used to detect peaks in the calculated frequency spectrum that indicate constant-packet-rate traffic.

An automated system for implementing the method preferably captures the set of internet protocol network data traffic from one or more network links, immediately performs the Fourier analysis on the set of internet protocol network data traffic and stores the results of the Fourier analysis in memory for later access.

DETAILED DESCRIPTION OF THE INVENTION

The present invention uses Fourier analysis of network data traffic to identify constant rate data traffic such as VoIP traffic. Fourier analysis uses a mathematical transform called a Fourier transform in order to evaluate the frequency content of a periodic time-domain function. In particular, a Discrete Fourier Transform (DFT) transforms a sequence of samples of a Lime-domain function into a sequence of samples in the frequency domain. The Fourier transform of any periodic function will contain peaks at any frequencies present in the function.

The data traffic for analysis is preferably collected from one or more network links connected in-line on the network. The time-domain data for the Fourier analysis is then obtained by counting the number of packets in a data stream that arrive within the time span represented by each time-domain sample. In order to perform the discrete Fourier transform, the present invention preferably uses a Fast Fourier Transform (FFT) algorithm. Once the Fourier transform has been computed, the results can be scanned for any peaks in order to determine the frequency content of the time-domain data. Any source sending packets at a near-constant rate will result in a peak in the frequency-domain data at the frequency equal to the rate at which that source is sending packets.

One advantage of using Fourier analysis is that the frequency content displayed by the Fourier transform clearly shows the telltale constant packet rate typical of VoIP traffic. The present inventors have found that these peaks will usually still be present even in the presence of significant network jitter or other anomalies that might lead to false negatives. The present inventors have also found that streaming video protocols with near-constant frame rates will also produce peaks, though these will be at different frequencies and with different packet sizes, allowing them to be easily distinguished from VoIP traffic.

Figure 1:
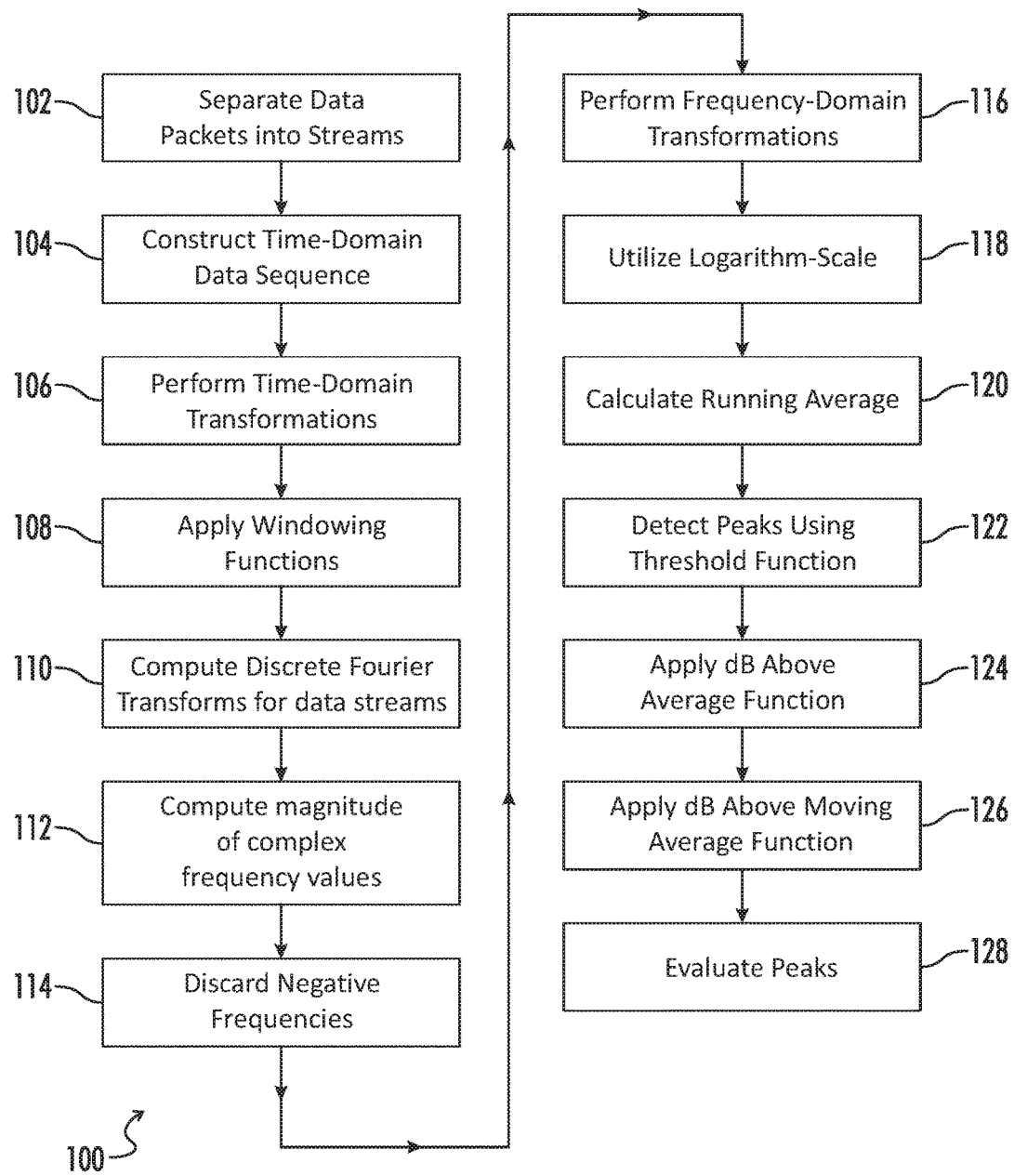
FIG. 1 is a flow chart of a method of classifying a set of internet protocol network data traffic as containing constant-packet-rate data in accordance with an embodiment of the present invention.

Referring now to FIG. 1, a flow chart of a method of classifying a set of internet protocol network data traffic as containing constant-packet-rate data in accordance with an embodiment of the present invention is shown. The first step in the classification is to separate the captured packets into individual data streams as shown in step 102. Each identified stream is preferably defined as consisting of packets with equal values for the source IP address, source port number, destination IP address, destination port number, and transport-layer protocol. Packets that do not use TCP or UDP protocols are preferably divided into streams based on the source IP address and destination IP address. In the discussed embodiment, all non-IP packets are placed in a single stream. While the above discussed stream definitions are preferred, alternative definitions can be used in different situations.

One advantageous property of the present invention is that, while separating into streams in the above-described traditional manner will usually be the most useful methodology and produce the clearest results, it is not necessary for the method to work. Since peaks at the frequency of the VoIP packets will still be present as long as those packets are included in the time-domain data, the presence of VoIP streams can still be determined even when the time-domain data also contains packets from other streams. Testing by the present inventors has shown that the peaks at the frequencies of the VoIP streams are still clearly visible in most cases even when all of the packets sent or received on the capture interface are being placed into the time-domain data.

The next step in the preferred method, step 104, is to construct the time-domain data sequence that will be input into the FFT algorithm. The time period to be considered is divided up into N equal time spans. N is known as the FFT size and, due to the design of the FFT algorithm, must be a power of 2. As explained in more detail below, the values chosen for N and the duration of each sample are important. Each value in the time-domain sequence will represent one of these N time spans and will consist of the number of packets in the selected stream that were received within that time span. In order to improve results, packets that are known not to be VoIP traffic may be excluded when constructing the time-domain data. In the embodiment discussed, packets with payloads of over 500 bytes are not counted, since, according to experimental findings, VoIP packets are almost always much smaller than this. This reduces noise in the data by removing unimportant packets from file transfers, HTTP requests, and other such traffic. Furthermore, the entire stream for a given DFT time window may be discarded if the number of packets received in that stream within that time window represents less than two packets per second, since VoIP systems must generate packets faster than that rate in order to keep audio latency to a minimum. In experiments, the slowest packet rates found for VoIP were still greater than 10 packets per second.

As the classification method progresses through time in a given packet capture, the FFT is applied more often than the duration required to collect enough time-domain information to compute an FFT. This is accomplished by applying a 'sliding window' function to the packet capture data. For example, to compute the FFT ten times as often, as if each FFT did not use overlapping data, we would collect N/10 new samples for each FFT and reuse the last 9N/10 samples that were used for the previous FFT. There are a couple of significant advantages to this approach. First, when a user is watching a display of the results, the more frequent FFTs allow the user's graph and the result of the classifier to update more often. In addition to making the system seem more responsive, this allows the user to detect a new VoIP stream more quickly when it first appears. Second, collecting the FFT more often helps the running average discussed below to converge to the average values more quickly, increasing the signal-to-noise ratio and, thus, the accuracy of the classifier.

Once the time-domain sequence data set has been constructed, the method proceeds to step 106 where time-domain transformations are performed. In particular, as is usually the case when computing discrete Fourier transforms, it is desirable to apply a windowing function to the time-domain data as shown in step 108. The presence of frequencies that are not integer multiples of the frequency represented by the first bin, the sampling rate divided by the DFT size, causes a non-integer number of periods of those signals to be present in the time-domain data. While a full discussion of the mathematics behind this effect is beyond the scope of this application, this situation where the first and last values in the time domain do not smoothly approach the same value causes these frequencies to be 'spread' between multiple bins in the DFT instead of being represented by a peak in a single bin. Windowing functions solve this problem by gradually reducing the values of the time-domain samples down to zero at each edge of the time-domain window while leaving them at full amplitude near the center of the time-domain window. Forcing the values to smoothly approach zero on both ends of the time-domain data helps to reduce this 'spreading' effect, but at the cost of widening the peaks, which lessens the ability to distinguish between two adjacent peaks. Several different window shapes which lead to different effects in the frequency domain are frequently used in digital signal processing (DSP) depending on the particular needs of the application.

Once the windowing functions are performed on the time domain data, the method proceeds to step 110 wherein Discrete Fourier Transforms are computed for the data streams. Once all desired time-domain transformations have been applied, the discrete Fourier transform is performed on the time-domain data in order to convert it into frequency-domain data. As mentioned above, the Fast Fourier Transform algorithm is preferably used to compute the DFT.

Once the DFT has been computed, some additional math is necessary to get the desired frequency-domain data. First, the results of a DFT are complex numbers. In order to get the magnitude of the frequency content for each resulting frequency bin, the magnitude of these complex vector values must be computed. This is done by computing the typical Euclidean 2-D vector magnitude for the complex value in each frequency bin as shown in step 112. In order to improve data visualization for a human user, it is also helpful to raise each magnitude to the fourth power to emphasize the peaks. However, since this does not actually increase the signal-to-noise ratio, it is omitted from an automated system, as it provides no benefit to the automated classifier.

When viewed in the frequency domain, the output of a DFT includes a mirror image of the frequency data. In particular, the actual zero frequency value is in the middle of the data and all values to its right are mirrored around it to create a 'negative' frequency image. Since this data is an exact mirror of the positive frequency information, it provides no useful information in the frequency domain and can be discarded as shown in step 114.

Once the FFT results have been computed, additional transformations may be applied to the frequency-domain data as shown in step 116. The discussed embodiment performs two preferred computations on the frequency-domain information. In step 118, the $\log_{10}$ of each data point is computed. DFT results typically have values that vary by many orders of magnitude, so it is usually most useful to evaluate results on a logarithmic scale. In particular, the use of a decibel (dB) scale is preferred.

Frequency-domain data computed from time-domain information in real-world applications usually contains significant amounts of random noise. In the present instance, this noise primarily results from jitter in packet arrival times, extraneous packets that may have been counted, such as signaling packets, as well as mathematical artifacts of the DFT. Since this noise is random in nature, its level within each frequency bin will vary dramatically from one FFT computation to the next. Peaks that represent a real signal, on the other hand, will have only very minor variation from one FFT computation to the next. As a result of these properties, keeping a running average of the last several FFTs, shown in step 120, averages out the random variation in the noise. This effect greatly increases the signal-to-noise ratio, which will in turn improves the accuracy of the classifier. Specifically, variation in the random noise is inversely proportional to the square root of the number of traces averaged. So, for instance, a 64-trace running average reduces random variation in noise amplitude by a factor of 8.

Once the frequency-domain transforms have been applied, the next step, step 122, is to compare the resulting frequency-domain data with a threshold function in order to detect peaks in the frequency-domain trace. Specifically, the frequency bin with the highest magnitude within any set of adjacent bins that have magnitudes above the level of the threshold function will be recorded as a peak.

One possible threshold function that can be applied is a dB above average amplitude function as shown in step 124. In accordance with such a threshold function, a given dB level above the average magnitude of the running-average trace is specified and any peaks that exceed this threshold are recorded. However, this threshold function performs poorly when some parts of the frequency spectrum have higher average noise levels than others. It can lead to both missed peaks in portions of the spectrum with lower average noise levels and false peak detections in portions of the spectrum with higher average noise values.

As a result of the drawbacks in the usage of the average amplitude, the preferred threshold function is implemented by computing a moving average over a given number of frequency-domain bins as shown in step 126. A given dB level above that moving average is then specified as the peak detection threshold. A slight modification on this function may be implemented wherein the fourth roots of the values within the moving average window are summed, divided by the number of points, and then the result raised back to the fourth power. This modification prevents the moving average itself from rising too much in the vicinity of peaks, which could result in a peak being missed. Both the root and width of the moving average window are tunable parameters in this function that can be selected by a user of the present invention.

The final step in the classification method is to evaluate the set of peaks detected by the threshold functions in order to classify the stream as containing VoIP traffic or not. As a straightforward method, a range of frequencies can be chosen to classify as VoIP when peaks are present in that range. The present inventors have determined experimentally that VoIP traffic frequencies generally lie between 10 Hz and 100 Hz, so the discussed embodiment of the classifier preferably uses this range. However, alternative methods of evaluating the detecting peaks can be used depending upon the application.

Figure 2:
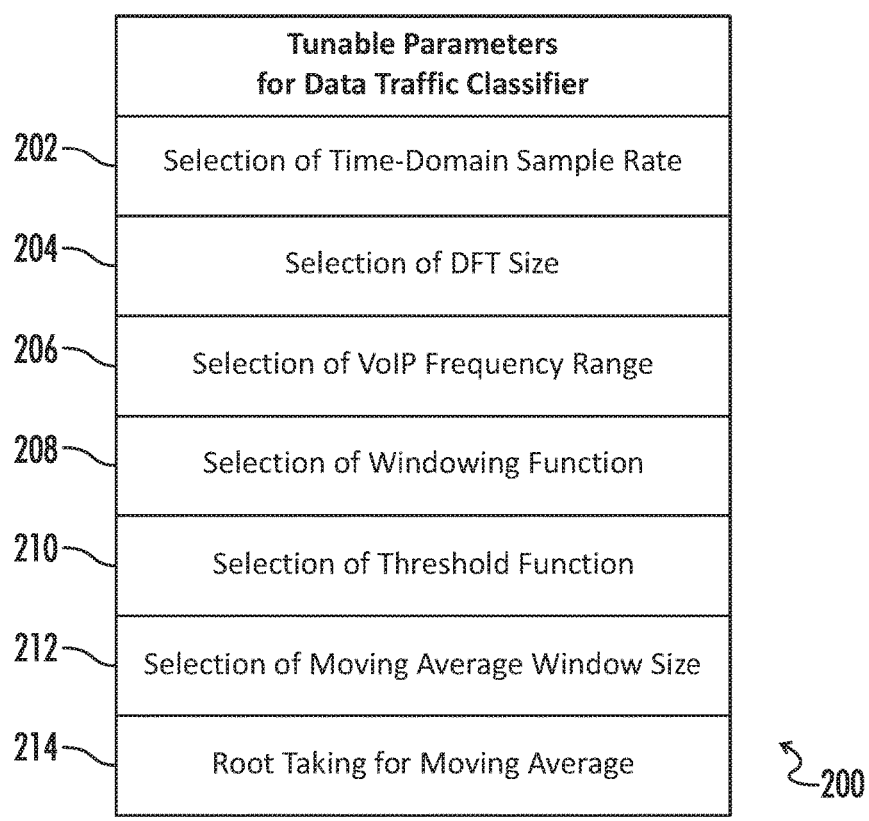
FIG. 2 is a table of tunable parameters for a classification system constructed in accordance with an embodiment of the present invention.

The present methods and apparatus for classifying IP signals include several tunable parameters. Referring now to FIG. 2 a list of tunable parameters 200 for the present classifying system and apparatus is shown. One of the first parameters that must be selected in any Fourier analysis system is the sample rate 202 to be used when collecting the time-domain data. The maximum frequency that can be detected by a system using a given sample rate is half of the sample rate, commonly referred to as the Nyquist frequency. As mentioned earlier, VoIP frequencies can be up to about 100 Hz, so an at least 200 Hz sampling rate is needed in order to accurately detect VoIP traffic. On the other hand, higher sample rates result in less frequency resolution for a given FFT size. That is, the frequency range represented by each data point will be wider, resulting in less accurate frequency information about a given peak. The present inventors have found that sample rates of 200 Hz-1,000 Hz, e.g. time-domain sample lengths of 5 ms-1 ms, respectively, yield the best detection results for VoIP. A value near the middle of that range, 500 Hz (a sample length of 2 ms), is preferred.

The DFT size 204, the number of samples that will be used as input to each DFT, is the next most important parameter to be selected in any Fourier analysis system. For a given sample rate, the DFT size will determine the available frequency resolution. It is also important to remember that, in order to use an FFT algorithm to compute the DFT, the DFT size must be a power of 2. As mentioned above, only half of the output values are meaningful. Since the highest frequency that can be detected is half of the sample rate, this means that the frequency resolution, the width of the frequency range represented by each output value, is equal to the sample rate divided by the size of the DFT. Using the preferred selection of 500 Hz for the sample rate, this means that a 128 point DFT would have frequency bin sizes of 3.9 Hz while a 512 point DFT would have frequency bin sizes of about 1 Hz and a 2,048 point DFT would have frequency bin sizes of about 0.24 Hz. A 2,048 point DFT is preferred for the classifier, as experimentation has shown 0.25 Hz resolution to work well for resolving the peaks produced by VoIP traffic while also being reasonable in regards to memory and processor usage.

Another important tunable parameter is the range of frequencies 206 that are classified as VoIP. Since the present inventors' experimentation has revealed that almost all VoIP systems have packet frequencies between 10 Hz and 100 Hz, this is the preferred range for the classifier.

As mentioned above, there are many different DFT windowing functions in use for various digital signal processing applications. While selecting a windowing function 208 is generally necessary in order to prevent spreading in the frequency domain known as spectral leakage from arising, which window is most appropriate for a given application depends on which information from the DFT is most important for that application. Each windowing function has different properties regarding spectral leakage and distortion of the magnitude and width of peaks. Since the present application is concerned primarily with the ability to resolve the frequency of peaks, the Hamming window was chosen for the windowing function, since it results in relatively minimal horizontal spread of peaks while still providing significant suppression of spectral leakage. The function used as the threshold for detecting peaks is another important selectable parameter framework. When selecting a threshold function 210, it is important that the selected threshold function tracks the noise floor of the frequency-domain data and remains slightly above the highest values of the random noise. Staying above the highest random noise values is important in order to prevent false positives in the peak detection. On the other hand, remaining as low as possible to still avoid the noise is needed in order to avoid missing peaks that might occur in portions of spectrum where the average noise values are lower. Furthermore, it is important that the threshold function rises and falls with the average noise values across the spectrum, but that it does not rise for actual peaks, since a threshold function that rises in the vicinity of peaks could cause those peaks to remain below the threshold and evade detection.

Figure 3:
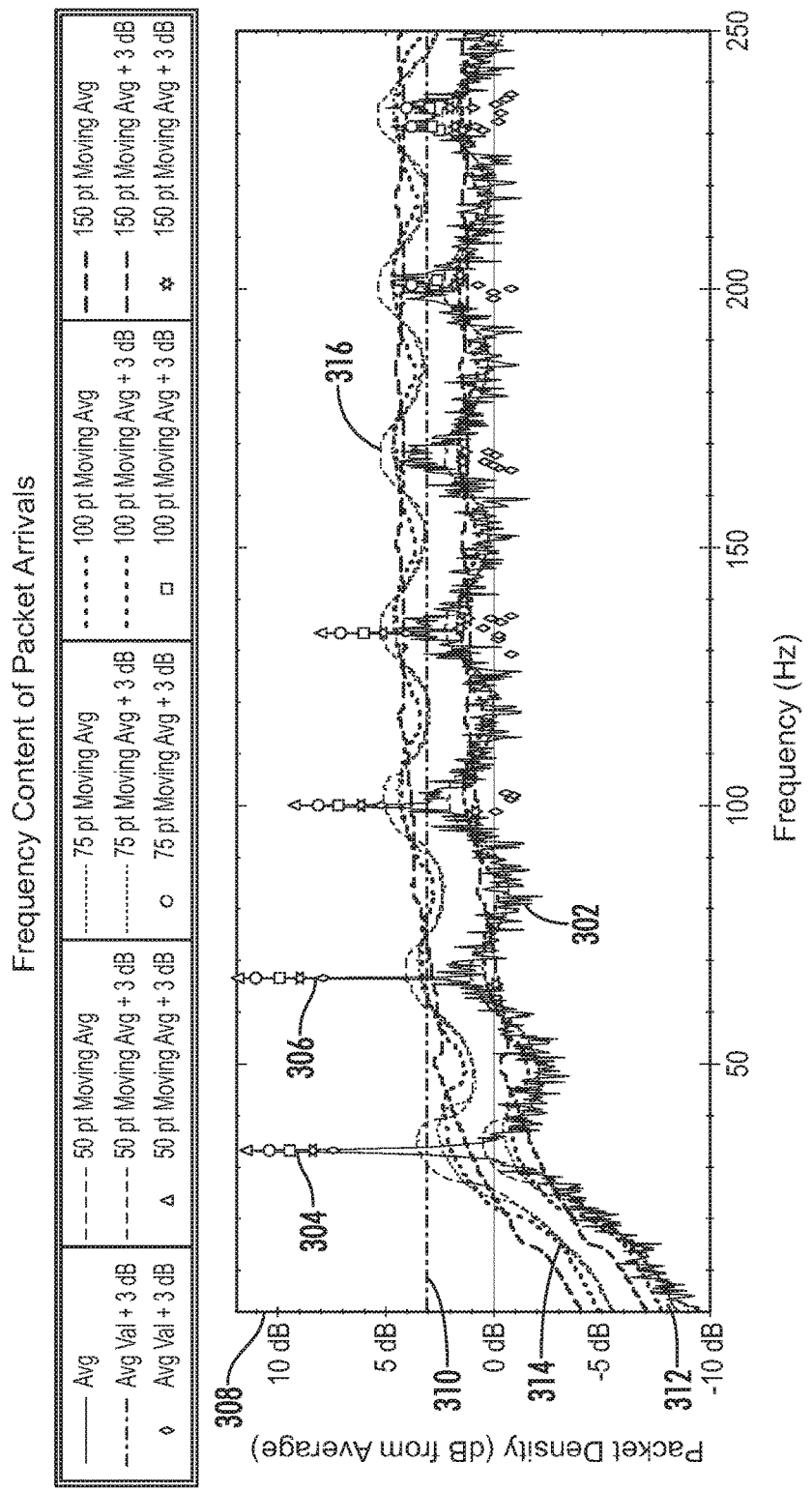
FIG. 3 is a graph of a Fast Fourier Transform of VOIP traffic showing the use of thresholds in accordance with an embodiment of the present invention.

As mentioned above, the discussed embodiment could use a constant dB level above the average value of the spectrum, but preferably uses a constant dB level above a moving or running average that attempts to track the noise floor as threshold functions. Both of these options can be seen in FIG. 3 where they have been applied to a trace generated from exemplary VoIP traffic such as a Skype call. The frequency trace shows the average trace 302 with peaks at the VoIP packet frequency 304 and its harmonics 306. The vertical axis 308 units have been set up as decibels with a reference level equal to the average of the frequency domain values. Furthermore, markers have been added at all frequencies where each threshold function detected a peak. The horizontal line 310 demonstrates the first threshold function option, a constant 3 dB above the average value over the spectrum. While it can be seen that this function correctly captures the true peaks, several spurious peaks where the random noise crosses this threshold can also be seen. The lines 312 represent the 50-point, 75-point, 100-point, and 150-point moving averages, respectively. For each of these, a threshold 314 equal to these moving averages plus 3 dB has also been drawn. It can be seen in the graph that, by adjusting to the local noise floor, these functions do not produce the false positives produced by using the constant-value threshold function, though they still capture the valid peaks. In FIG. 3, four different options for the moving average window size and the thresholds generated by each of these can also be seen. While it can be seen that all four thresholds correctly capture the first four peaks and none of them produce any false positives, it can also be seen that the 50-point moving average 316 rises significantly in the vicinity of each peak and this causes it to fail to detect the last three peaks. The 75-point and 100-point moving averages, on the other hand, rise much less in the vicinity of peaks and correctly capture all 7 peaks while still producing no false positives. The 150-point moving average also correctly captures each peak, but it can be seen in several different portions of the graph that the 150-point trace does not sufficiently track the local noise floor. While this did not end up resulting in any false negatives or false positives in this particular example, it certainly could in some situations. In light of these results, the 100-point moving average plus 3 dB is preferred as the threshold function for the classifier, since it does the best job of staying above the random noise while not rising dramatically in the vicinity of peaks.

Figure 4:
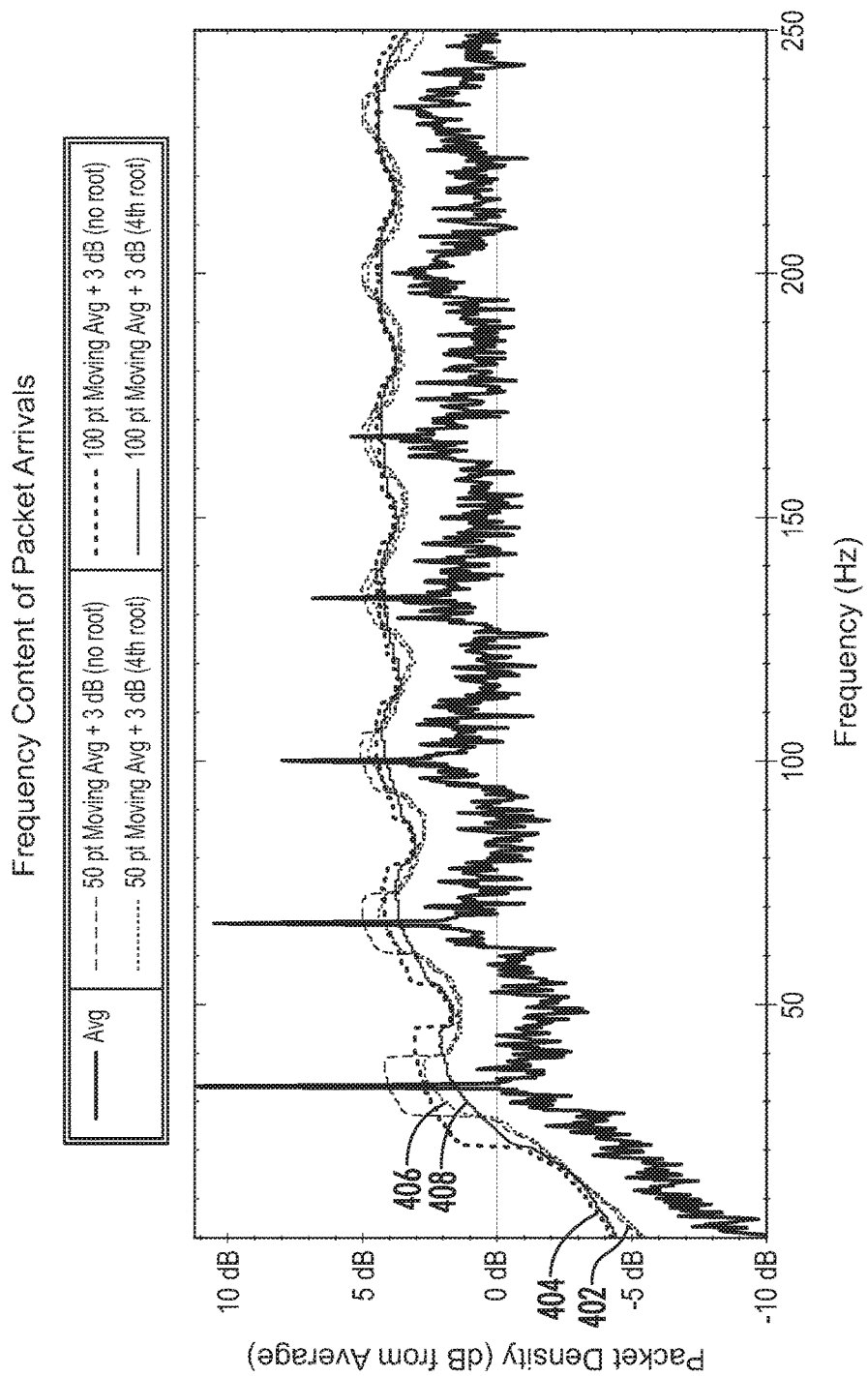
FIG. 4 is a graph of a Fast Fourier Transform of VOIP traffic showing the use of no-root and $4^{th}$-root moving average thresholds in accordance with an embodiment of the present invention.

FIG. 4 shows the 50-point 402 and 100-point 404 +3 dB threshold functions both with and without taking the fourth root of the values before averaging. As can be seen, both the 50-point and 100-point moving averages rise dramatically in the vicinity of peaks when the root is not taken. Taking the fourth roots as shown in lines 406 and 408, however, suppresses most of this undesirable rise. For each of the thresholds, using a square root would produce a line between the no-root line and the fourth-root line. For the preferred classifier, the fourth root is used in order to keep rises in the vicinity of peaks to a minimum.

There are several advantages to the present VoIP detection method using Fourier analysis. The primary advantage is that the frequency of VoIP packets will still be present in the results of the Discrete Fourier Transform even if the stream contains other packets. This frequency component will be unaltered by other "noise" packets in the stream, unlike the average inter-packet time or variance of in inter-packet time, which could be dramatically altered by the presence of "noise" packets. This allows the present invention to detect VoIP streams that other methods would likely miss. Additionally, if multiple VoIP streams are present in the data being transformed, the packet frequency of each of those streams will appear in the FFT graph. Furthermore, multiple streams can be fed into the FFT at the same time, allowing detection of more complicated schemes where parts of the VoIP stream are sent on different ports in an attempt to evade detection. These advantages make using the FFT significantly more robust in terms of the types of VoIP streams that it is capable of detecting.

In addition to being more robust, using Fourier analysis for VoIP detection also has other advantages. It does not require extensive training data sets to be generated or pre-classified nor does it require the user to classify clusters. These are large advantages of the statistical and Fourier analysis methods, as generating sufficient training data to be representative of all of the types of network traffic that the system could encounter is extremely difficult. Another advantage of the Fourier analysis is that, while most people are not familiar with its mathematical foundation, most users of a VoIP detection system are already familiar with seeing amplitude vs. frequency graphs from the spectrum analyzers on audio equipment or electromagnetic spectrum analyzers used for electrical engineering and signal discovery/analysis applications. Also, since displaying amplitude vs. frequency data is a common need in electronic test equipment, there are well-established user interface designs for displaying such data that already exist. These user interfaces include the concept of spectrograms, which use the y-axis to display multiple spectral traces over time and use the pixel color to indicate amplitude. Another user interface advantage with Fourier analysis is that, unlike some machine learning methods or even some heuristics, it should be obvious to the user by looking at the graph why the system is classifying a stream as VoIP or non-VoIP.

Although there have been described particular embodiments of the present invention of a new System and Method for Detecting VOIP Traffic, it is not intended that such references be construed as limitations upon the scope of this invention except as set forth in the following claims.

What is claimed is:

1. A method of detecting constant-packet-rate data traffic in a set of internet protocol network data traffic, said method comprising:

performing frequency spectrum analysis using a Discrete Fourier Transform on data packet arrival times to classify said set of internet protocol network data traffic based upon potential constant-packet-rate data content; and constructing time-domain input data for said frequency spectrum analysis by dividing a period of time during which said internet protocol network data traffic was collected to be analyzed into equal-duration time slices and counting a number of packets received during each time slice.

2. The method of claim 1 further comprising the step of using detected peak frequencies to classify any constant-packet-rate traffic within said internet protocol network data traffic based upon potential voice over Internet Protocol traffic content.

3. The method of claim 2 further comprising the step of using at least one of average packet size, variance in packet size, source IP address, destination IP address, source port number, destination port number, or transport-layer protocol to classify portions of said set of internet protocol network data traffic based upon potential voice over Internet Protocol traffic content.

4. The method of claim 1 wherein a sliding window function is used to provide said time-domain input data to said frequency spectrum analysis.

5. The method of claim 1 further comprising the step of filtering said internet protocol network data traffic prior to performing the frequency spectrum analysis by one or more of packet size, source IP address, destination IP address, source port number, destination port number, or transport-layer protocol.

6. The method of claim 1 further comprising the step of capturing said set of internet protocol network data traffic from a single network link, immediately performing said frequency spectrum analysis on said set of internet protocol network data traffic and storing results of said frequency analysis in memory for later access.

7. The method of claim 6 further comprising the step of performing said method with an apparatus connected in-line on said network link from which said set of internet protocol network data traffic is obtained.

8. The method of claim 1 further comprising the step of capturing said set of internet protocol network data traffic from a single network link, immediately performing said frequency spectrum analysis on said set of internet protocol network data traffic and displaying the results of said frequency spectrum analysis to a user.

9. The method of claim 8 further comprising the step of performing said method with an apparatus connected in-line on said network link from which said set of internet protocol network data traffic is obtained.

10. The method of claim 1 wherein the frequency spectrum analysis is performed on network data traffic that had previously been collected from a single network link and saved to memory.

11. The method of claim 10 further comprising the step of performing said method with an apparatus connected in-line on said network link from which said set of internet protocol network data traffic is obtained.

12. The method of claim 1 further comprising the step of capturing said set of internet protocol network data traffic from one or more network devices, immediately analyzing said set of internet protocol network data traffic and storing results of said analysis in memory for later access.

13. The method of claim 1 further comprising the step of capturing said set of internet protocol network data traffic from one or more network devices, immediately analyzing said set of internet protocol network data traffic and displaying results of said analysis to a user.

14. The method of claim 1 wherein said frequency spectrum analysis is performed on network traffic data that had previously been collected from one or more network devices and saved to memory.

15. The method of claim 1 further comprising the step of performing a windowing function on time-domain input data for said frequency spectrum analysis prior to performing said frequency spectrum analysis.

16. The method of claim 15 wherein said windowing function consists of multiplying the time-domain input data by a Hamming window.

17. The method of claim 1 further comprising the step of using a threshold function to detect peaks in said frequency spectrum analysis output data.

18. The method of claim 17 wherein the threshold function is a moving average of frequency-domain data values produced by the frequency spectrum analysis plus a constant offset.

19. The method of claim 18 wherein a root is taken of each of the frequency-domain data values before computing their running average and then the computed running average is raised back to a power of the root that was taken.

20. The method of claim 1 further comprising the step of using detected peak frequencies to classify any constant-packet-rate traffic within said internet protocol network data traffic based upon potential streaming video traffic content.

21. The method of claim 20 further comprising the step of using one or more of average packet size, variance in packet size, source IP address, destination IP address, source port number, destination port number, or transport-layer protocol to classify portions of said set of internet protocol network data traffic based upon potential streaming video traffic content.

22. A method of detecting constant-packet-rate data traffic in a set of internet protocol network data traffic to identify potential surveillance data in said set of internet protocol network data traffic, said method comprising:
performing frequency spectrum analysis using a Discrete Fourier Transform on data packet arrival times to classify said set of internet protocol network data traffic based upon a potential constant-packet-rate data content; and
capturing said set of internet protocol network data traffic from a single network link, immediately performing said frequency spectrum analysis on said set of internet protocol network data traffic and storing results of said frequency analysis in memory for later access.

23. A method of detecting constant-packet-rate data traffic in a set of internet protocol network data traffic, said method comprising:
performing frequency spectrum analysis using a Discrete Fourier Transform on data packet arrival times to classify said set of internet protocol network data traffic based upon potential constant-packet-rate data content; and
constructing time-domain input data for said frequency spectrum analysis by dividing a period of time during which data traffic was collected into equal-duration time slices with each time slice assigned a value based on an examination of data packets received during the time slice.

* * * * *